No. 711,119. Patented Oct. 14, 1902.
F. G. PENNOCK.
BOX MACHINE.
(Application filed Apr. 4, 1902.)
(No Model.) 3 Sheets—Sheet 1.

Witnesses:
Nathan C. Lombard 2nd
Charles F. Logan.

Inventor:
Frederick G. Pennock,
by Lombard & Cobb Attys.

No. 711,119. Patented Oct. 14, 1902.
F. G. PENNOCK.
BOX MACHINE.
(Application filed Apr. 4, 1902.)

(No Model.) 3 Sheets—Sheet 2.

Witnesses:
Nathan C. Lombard 2nd
Charles F. Logan

Inventor:
Frederick G. Pennock,
by Lombard & Cobb,
Attys.

No. 711,119. Patented Oct. 14, 1902.
F. G. PENNOCK.
BOX MACHINE.
(Application filed Apr. 4, 1902.)
(No Model.) 3 Sheets—Sheet 3.
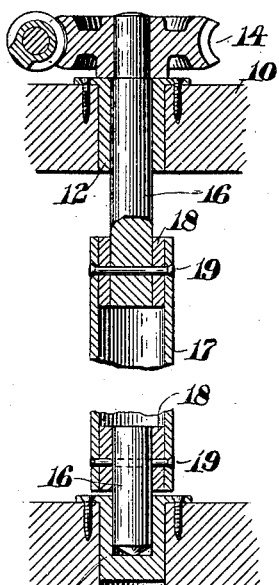
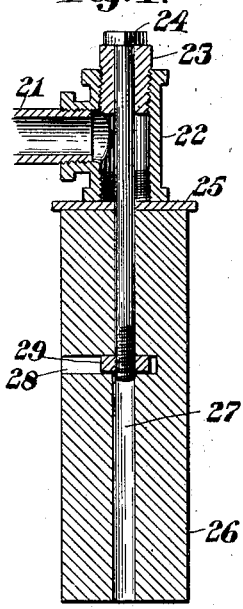
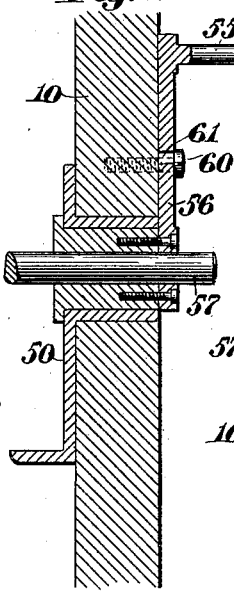
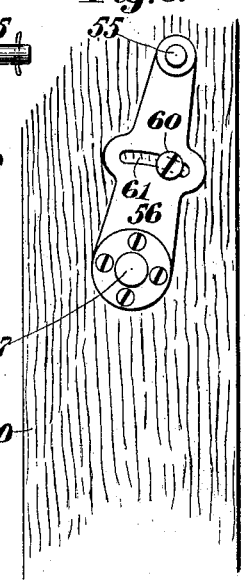
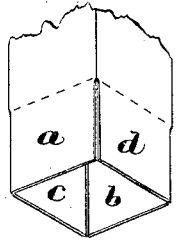
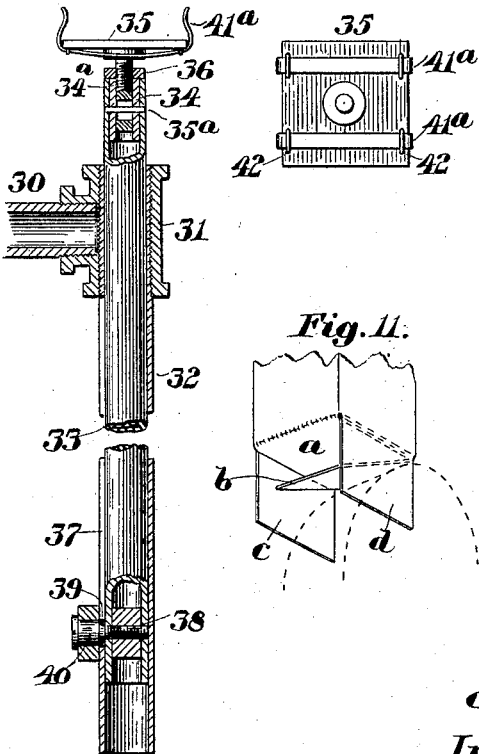
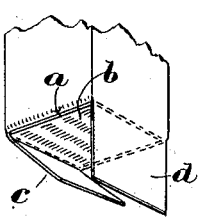
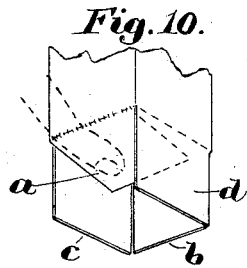
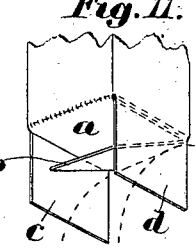
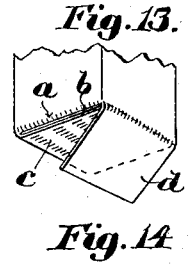
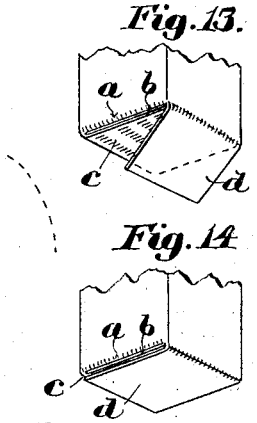
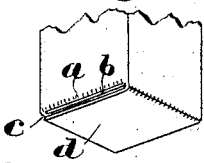
Witnesses:
Nathan C. Lombard 2nd
Charles F. Logan
Inventor:
Frederick G. Pennock,
by Lombard & Cobb Attys.

UNITED STATES PATENT OFFICE.

FREDERICK G. PENNOCK, OF SOUTH BRAINTREE, MASSACHUSETTS.

BOX-MACHINE.

SPECIFICATION forming part of Letters Patent No. 711,119, dated October 14, 1902.

Application filed April 4, 1902. Serial No. 101,360. (No model.)

*To all whom it may concern:*

Be it known that I, FREDERICK G. PENNOCK, a citizen of the United States of America, and a resident of South Braintree, in the county of Norfolk and State of Massachusetts, have invented certain new and useful Improvements in Box-Machines, of which the following is a specification.

My invention more particularly relates to machines for operating upon partly-finished pasteboard boxes which have their sides already formed to apply glue or adhesive material to flaps at one end of the carton and fold and press these flaps together to form the bottom.

The invention consists in the various features hereinafter described and claimed, which render the machine simple in construction and efficient in operation.

Figure 1:
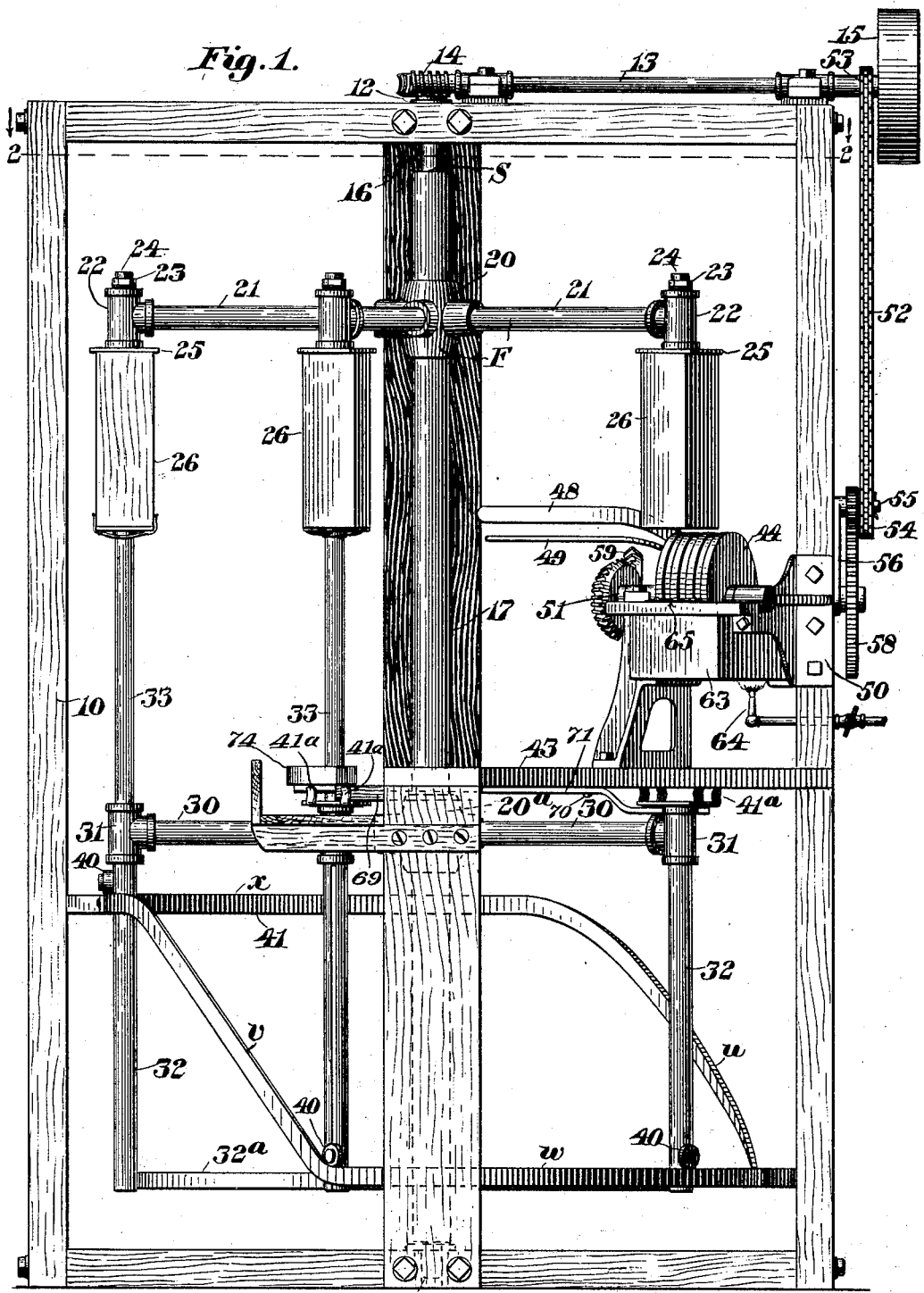
Figure 2:
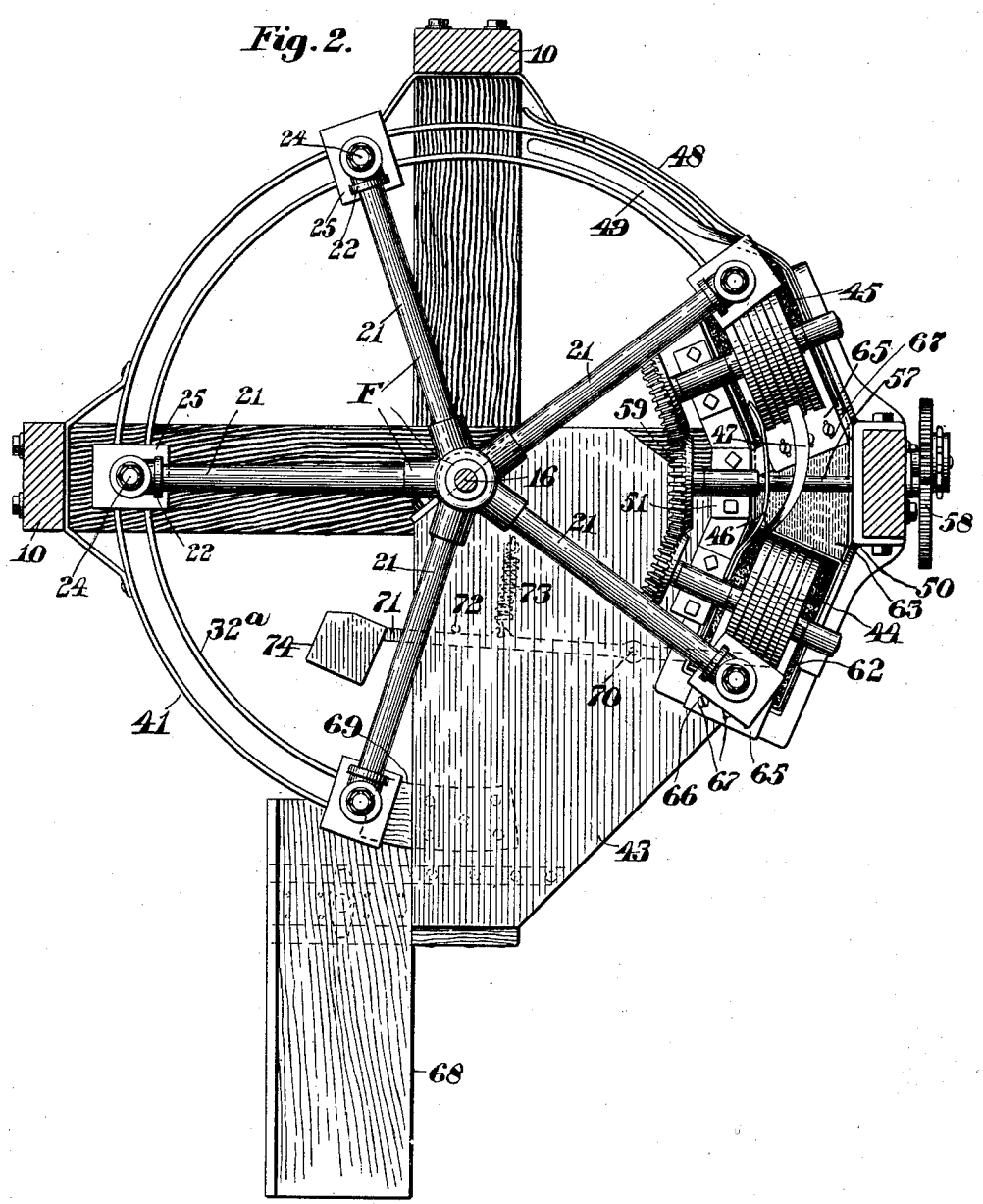

In the accompanying drawings, Figure 1 is a front elevation of one embodiment of my invention. Fig. 2 is a horizontal section on the line 2 2 of Fig. 1 looking in the direction of the arrows. Fig. 3 is a broken sectional detail of a portion of the rotatable frame. Fig. 4 is a sectional detail showing the means for securing the carton-holding heads to their support. Fig. 5 is a broken sectional detail of a pressure member. Fig. 6 is a bottom plan view of the pressure-head. Figs. 7 and 8 are respectively a vertical section and front elevation of adjusting mechanism for a portion of the gearing. Fig. 9 shows the bottom portion of a carton to be operated upon, and Figs. 10 to 14 illustrate various steps in the process of forming the bottom thereof.

Similar characters indicate like parts throughout the several figures of the drawings.

A suitable supporting-frame, here shown as consisting of wood and designated by the numeral 10, is provided in a lower cross-bar with a step-bearing 11 and in an upper cross-bar with a bearing 12. In these bearings is supported a movable frame F by means of a vertical shaft S, which may be slowly rotated from a horizontal shaft 13, journaled in bearings upon the top of the frame 10 by worm-gearing 14, the shaft 13 being driven at the desired speed through a pulley 15. The shaft S may be conveniently formed of end rods 16 16, connected by a vertical tubular member or pipe 17, there being intermediate bushings 18 and pins 19, securing the parts together. In this pipe are inserted or made up in the usual manner two crosses 20 20$^a$, each provided with a suitable number of outlets, here shown as five in number. In the cross 20 are screwed or otherwise secured horizontal pipes 21, carrying at their outer ends T's or supporting members 22, having their run lying vertically. Into the top of each T may be threaded a plug 23, through a hole in which passes a bolt 24. Against the under side of each T abuts a gage-plate 25, and against this gage-plate rests a block or head 26 of suitable size to hold the carton to be operated upon and serve as a carrier therefor. Each head is provided with a longitudinal passage 27, preferably extending its entire length, and with a side recess 28, here shown as somewhat above the center of the block and communicating with the passage. The bolt is of such length as to extend past this recess, permitting a nut 29 to be inserted therein with its opening in alinement with the passage to be engaged by the bolt and serve to clamp the gage-plate and head to the T.

The lower cross 20$^a$ carries horizontal pipes 30, with T's or supports 31, similar to those just described, and from these T's depend pipes or tubular members 32, connected together or stayed by a ring 32$^a$. Within these tubular members slide pressure members here shown as each consisting of a rod 33, which may be hollow and closed at its top by a plug 34, into which extends the slotted shank 34$^a$ of a head 35 in alinement with one of the carriers and held against rotation while allowed a longitudinal movement by a pin 35$^a$ passing through the rod, bushing, and slot. The shank is threaded and engaged by a nut 36, resting upon the top of the rod, this nut when turned permitting the pressure-head to be adjusted toward and from the carrier to vary the amount of pressure with which they coact. Each tubular member has a vertical slot 37, through which projects a stud 38, carried by the rod, which stud may carry an antifriction-roll 39, coöperating with the walls of the slot, and an antifriction-roll 40, outside the member 32. A cam-ring 41, conveniently fixed upon the lower part of the frame 10, coacts with the rolls 40 and is provided with inclined faces $u$ $v$ and substantially horizontal faces $w$ $x$, which cause the reciprocation of the pressure members toward and from the carton-holding heads with intermediate periods of rest in a lowered and raised position. Each pressure-head is preferably provided with a carton-grasping device, here shown as consisting of a pair of spring-fingers $41^a$ $41^a$, extending across the lower side of the head, being curved or bowed outwardly therefrom and projecting above the pressure-head toward the carrier. Pairs of loops 42 42 near the edge of the pressure-head retain the springs in place and allow them some movement therein, so that when the bowed portion contacts with any member, as the top of a T 31, it flattens them against the under side of the pressure-head and slightly separates the upward projections.

In one quarter of the frame 10, in a plane high enough to permit the lowered pressure-heads to pass beneath it, is located a table 43, at which the operator may stand, and near the rear of this table, in the path of the cartons as they are moved by the carriers, are situated glue-applying and folding devices. In the present instance these consist of a pair of glue-rolls 44 45, one of which may also act as a folder, and pairs of independent folders or spring-arms 46 47 and 48 49. The shafts of the glue-rolls may be journaled in bearings in castings 50 51, secured, respectively, to the framework 10 and to the table, and said rolls are rotated at the desired speed from the shaft 13 by a chain 52, extending over a sprocket 53 thereon, and a sprocket 54, carried by a shaft 55, journaled in an arm 56. This arm is pivoted on a shaft 57, and this latter shaft is rotated from the sprocket-shaft through spur-gearing 58. The shaft 57 in turn rotates the glue-rolls through bevel-gearing 59. A clamping-screw 60, threaded into the frame and passing through a slot 61 in the arm 56, enables the angle of said arm about the shaft 57 to be changed, securing an adjustment in the distance between the two sprockets and permitting the chain to be tightened without disturbing the relation of the gearing. The glue-rolls operate in tanks 62 62, containing the glue maintained in the fluid state by immersion in a tank 63 of water heated by a burner 64. Both these tanks may be supported upon the castings 50 51. The rolls are preferably grooved, as illustrated, to limit the amount of glue applied, and suitably-formed doffer-plates 65 65, supported from the castings 50 51 and adjustably secured by screws 66, extending through slots 67, serve to remove the excess of glue from the rolls. At the rear of the roll 44, conveniently secured to the casting 50, is the arm 46, extending between the sides of the rolls, and the arm 47, lying in a vertical plane at the side of the roll 44 and then bent to occupy a horizontal plane between and near the upper surface of the rolls. The springs 48 and 49 may be supported from the casting 51 at the rear of the roll 45 and are formed similarly to 46 47, but are of greater length.

At the opposite side of the table from the gluing and folding devices is a shelf 68, situated somewhat below the plane of the table, and above the shelf, in a plane just above the top of the pressure-heads when these are in the lowest position, is a fixed displacing device for the cartons consisting of a stop 69, so formed and located as to pass between the grasping-fingers $41^a$ $41^a$. Pivoted at 70, beneath the table at one side of the path of the carton, is a lever or movable displacing device 71, held normally against a stop-pin 72 by a spring 73, with one arm projecting into the path of some of the revoluble elements—as, for example, the T's 31—and the other end, or a head 74, carried thereby, movable against a carton after its contact with the fixed stop and acting in a different direction thereupon.

In the operation of the machine the frame F being continuously rotated at such a rate that the carriers will revolve or travel over the table at a suitable speed the operator places a carton with extended flaps, as is shown in Fig. 9 of the drawings, upon the carrier passing in front of him with its upper edge against the gage-plate and holds the flap $a$ in the position illustrated in Fig. 10 until the glue-roll 44, entering between the flaps $c$ $d$, contacts with the flap $b$ and folds it up against the flap $a$, Fig. 11. As the carton passes on over the roll 44 the arm 47 engages the flap $c$, folds it up against the freshly-glued surface, as is indicated in Fig. 11, the arm 46 preventing the bulging of the side of the box, and holds it there until the roll 45 engages the flap $c$ and applies the necessary glue. Then the arm 49 folds up the flap $d$, this arm and its companion 48 acting, as do the preceding pair, upon the opposite flap $c$, and presses it against the freshly-glued surface. While these operations are being performed the roll 40 of the pressure member in alinement with the carrier is moving over the horizontal portion $w$ of the cam 47, permitting the pressure-head to pass below the table. As the carton is engaged by the folders 48 49 the roller reaches the incline $u$ of the cam and the head rises until just as the carton passes these folders the head contacts with the folded flaps, forcing the fingers 41 up over the sides of the carton. The head is so adjusted that when the roll rides onto the horizontal face $x$ it will be exerting the necessary pressure to hold the flaps firmly together. This cam portion $x$ is sufficiently long to secure the necessary pressure to insure perfect adhesion of the flaps, and when its end is reached the roll moves down the cam-incline $v$ until it returns the pressure-head to its initial level. As the pressure member falls the fingers 41 draw the carton from the carrier, the opening in the block through the passage and recess allowing the air to flow in by the upper portion of the sides and destroy the vacuum at the bottom to prevent resistance by atmospheric pressure to the withdrawal. Just as the pressure member approaches its lowest point the bowed portion of the springs 41 contacts with the T's 31, causing them to release their grasp upon the completed carton, which then contacts with the stop 69 and is forced off the head. As the carton is being displaced from the head the lever 71, the outer end of which is in contact with the rod 33 in advance of the one by which the carton is carried, strikes said carton and discharges it onto the shelf 68. The lever is then released by the rod passing it and is returned by the spring 73 against its stop.

It will be understood that as soon as the flap $a$ of each carton is engaged by the glue-roll 44 the operator places another carton upon the succeeding head and holds up the flap $a$ as before, when the operation of completing the bottom continues automatically.

This machine, which is comparatively inexpensive, is effective and rapid in operation and by changes in the carton-holding heads, pressure-heads, and coacting parts may be used for boxes of various sizes.

Having thus described my invention, I claim—

1. In a box-machine, the combination with a plurality of revoluble carriers, of a glue-applying device, and a pressure member revolving in alinement with each carrier, each pressure member being mounted independently of its carrier and opposite the end thereof.

2. In a box-machine, the combination with a movable carrier, of a glue-applying device, a slidable pressure member movable with the carrier, and means for reciprocating the pressure member toward and from the carrier.

3. In a box-machine, the combination with a movable carrier, of a glue-applying device, a slidable pressure member movable with the carrier, and a cam coacting with the pressure member for reciprocating it toward and from the carrier.

4. In a box-machine, the combination with a movable carrier, of a glue-applying device, a slidable pressure member movable with the carrier, and a fixed cam coacting with the pressure member for reciprocating it toward and from the carrier.

5. In a box-machine, the combination with a movable carrier, of a glue-applying device, a pressure member movable with the carrier, and a grasping device mounted upon the pressure member.

6. In a box-machine, the combination with a movable carrier, of a glue-applying device, a pressure member movable with the carrier, and spring-fingers mounted upon the pressure member and projecting toward the carrier.

7. In a box-machine, the combination with a movable carton-carrier, of a glue-applying device, a pressure member movable with the carrier by which the carton is received, and a displacing device operating in proximity to the pressure member to remove the carton therefrom.

8. In a box-machine, the combination with a plurality of revoluble carriers, of a glue-applying device, a pressure member revolving in proximity to each carrier, and a displacing device operating in proximity to one pressure member and operable by another revoluble member.

9. In a box-machine, the combination with a plurality of revoluble carriers, of a glue-applying device, a pressure member revolving with each carrier, and a fixed displacing device located above the path of the pressure member.

10. In a box-machine, the combination with a movable carrier adapted to receive a carton with extended flaps and a pressure member movable with the carrier, of a glue-applying device lying between the paths of the carrier and pressure member and so formed and situated as to enter between two of the said flaps.

11. In a box-machine, the combination with a revoluble carrier adapted to receive a carton with extended flaps, of means for gluing and folding certain of the flaps during the revolution of the carrier, a pressure member revolving with the carrier, means for forcing the pressure member against the carton after the flaps have been glued and folded and then withdrawing it, and a grasping device mounted upon the pressure member for removing the carton from the carrier.

12. In a box-machine, the combination with a revoluble carrier adapted to receive a carton with extended flaps, of means for gluing and folding certain of the flaps during the revolution of the carrier, a pressure member revolving with the carrier, means for forcing the pressure member against the carton after the flaps have been glued and folded and then withdrawing it, a grasping device mounted upon the pressure member for removing the carton from the carrier, and means for releasing the grasping device.

13. In a box-machine, the combination with a revoluble carrier adapted to receive a carton with extended flaps, of means for gluing and folding certain of the flaps during the revolution of the carrier, a pressure member revolving with the carrier, means for forcing the pressure member against the carton after the flaps have been glued and folded and then withdrawing it, a grasping device mounted upon the pressure member for removing the carton from the carrier, means for releasing the grasping device, and a displacing device acting upon the carton after the release of the grasping device.

14. In a box-machine, the combination with a revoluble carrier adapted to receive a carton with extended flaps, of means for gluing and folding certain of the flaps during the revolution of the carrier, a pressure member revolving with the carrier, means for forcing the pressure member against the carton after the flaps have been glued and folded and then withdrawing it, a grasping device mounted upon the pressure member for removing the carton from the carrier, means for releasing the grasping device, and a plurality of displacing devices acting in different directions upon the carton after the release of the grasping device.

15. In a box-machine, the combination with a rotatable frame, of a carton-holding head carried by the frame, and a pressure member sliding in the frame and coacting with the head.

16. In a box-machine, the combination with a rotatable frame, of a carton-holding head carried by the frame, a pressure member sliding in the frame and coacting with the head, and a cam for reciprocating the pressure member.

17. In a box-machine, the combination with a rotatable frame including a tubular member, of a carton-holding head carried by the frame, a rod sliding in the tubular member and provided with a pressure-head in alinement with the carton-holding head, and means for reciprocating the rod.

18. In a box-machine, the combination with a rotatable frame including a tubular member, a carton-holding head carried by the frame, a rod sliding in the tubular member and provided with a pressure-head in alinement with the carton-holding head, a roll mounted upon the rod, and a cam with which the roll coacts.

19. In a box-machine, the combination with a rotatable frame including a slotted tubular member, a carton-holding head carried by the frame, a rod sliding in the tubular member and provided with a pressure-head in alinement with the carton-holding head, a stud projecting from the rod through the slot in the tubular member, a roll on the stud operating in the slot, a second roll on the stud outside the tubular member, and a cam with which this second roll coacts.

20. In a box-machine, the combination with a rotatable frame including a tubular member, a carton-holding head carried by the frame, a rod sliding in the tubular member and provided with a pressure-head adjustably threaded into the rod in alinement with the carton-holding head, and means for reciprocating the rod.

21. In a box-machine, the combination with a carton-holding head, of a pressure-head movable toward and from the carton-holding head, and springs projecting above the edge of the pressure-head and adapted to grasp the carton.

22. In a box-machine, the combination with a rotatable frame, of a carton-holding head carried by the frame, a pressure member sliding in the frame and coacting with the head, springs projecting above the edge of the pressure-head and adapted to grasp the carton, and means for separating the springs to cause them to release the carton.

23. In a box-machine, the combination with a rotatable frame, of a carton-holding head carried by the frame, a pressure member sliding in the frame and coacting with the head, springs projecting above the edge of the pressure-head and adapted to grasp the carton, means for separating the springs to cause them to release the carton, and a stop located in the path of the carton.

24. In a box-machine, the combination with a carton-holding head, of a pressure-head movable toward and from the carton-holding head, springs extending across the pressure-head on the outer side, being curved or bowed outwardly therefrom and having their ends projecting inwardly toward the carton-holding head, and a member with which the bowed portion of the springs coacts to cause a separation of the ends.

25. In a box-machine, the combination with a movable carton-grasping device, of a stop located in the path of the carton, a lever pivoted at one side of the path of the carton, and means for causing the lever to strike the carton and displace it to one side of the grasping device after said carton has contacted with the stop.

26. The combination with a rotatable frame, of a carton-grasping device carried thereby, and a lever pivoted at one side of the path of the carton and having an arm normally extending into the path of an element rotating with the frame and another arm movable against the carton.

27. In a box-machine, the combination with a supporting member, of a carton-holding head provided with a longitudinal passage opening at each end thereof and a lateral recess communicating with the passage, of a bolt passing through the supporting member into the head, and a nut adapted to enter the recess and engage the bolt.

28. In a box-machine, the combination with a supporting member, of a carton-holding head provided with a longitudinal passage and a lateral recess communicating with the passage, of a gage-plate, a bolt passing through the supporting member and gage-plate into the head, and a nut adapted to enter the recess and engage the bolt.

29. In a box-machine, the combination with a supporting member, of a carton-holding head provided with a longitudinal passage extending through the block and a lateral recess communicating with the longitudinal passage and permitting the movement of air therethrough, of a bolt passing through the supporting member into the head, and a nut adapted to enter the recess and engage the bolt.

30. In a box-machine, the combination with a supporting-frame, of a vertical pipe mounted therein, two crosses made up in the pipe, horizontal pipes projecting from the crosses, T's upon the ends of the horizontal pipes, carton-holding heads depending from the upper T's, and pressure members mounted in the lower T's.

Signed by me at Boston, Massachusetts, this 2d day of April, 1902.

FREDERICK G. PENNOCK.

Witnesses:
SYLVANUS H. COBB,
MARGARET HARRISON.